United States Patent [19]

Schmid et al.

[11] Patent Number: 5,130,517
[45] Date of Patent: Jul. 14, 1992

[54] FLAME-TYPE HEATER PLUG WITH TWO CONTROL COILS FOR AN AIR-COMPRESSION FUEL-INJECTION INTERNAL-COMBUSTION ENGINE

[75] Inventors: Friedrich Schmid; Peter Joppig, both of Korb; Roland Klak, Ostfildern, all of Fed. Rep. of Germany

[73] Assignee: Mercedes-Benz AG, Fed. Rep. of Germany

[21] Appl. No.: 658,679

[22] Filed: Feb. 21, 1991

[30] Foreign Application Priority Data

Mar. 8, 1990 [DE] Fed. Rep. of Germany ....... 4007340

[51] Int. Cl.⁵ .................. H05B 3/00; F02M 31/00; F02P 19/00; F23Q 7/00
[52] U.S. Cl. ................. 219/270; 123/145 A; 123/550; 123/549; 123/557; 219/553
[58] Field of Search ................. 219/260–270, 219/552, 553, 523; 123/145 R, 145 A, 179 H, 549, 557

[56] References Cited

U.S. PATENT DOCUMENTS 3,537,435 11/1970 Beesch et al. ............... 123/145 R X
4,587,941 5/1986 Mishima et al. .................... 123/550

FOREIGN PATENT DOCUMENTS 1167474 4/1964 Fed. Rep. of Germany .
3309133 9/1984 Fed. Rep. of Germany .

OTHER PUBLICATIONS

Beru Trade Brochure.

Primary Examiner—Anthony Bartis
Attorney, Agent, or Firm—Evenson, Wands, Edwards, Lenahan & McKeown

[57] ABSTRACT

The invention relates to a flame-type heater plug for an air-compression fuel-injection internal-combustion engine, especially a direct-injection and superchargable internal-combustion engine. The heater plug includes a heater tube arranged in the course of a plug housing and protective tube and has an integrated first control coil at a level of passage orifices in the protective tube, heating coil and a second control coil arranged outside the protective tube at a side of the heating coil opposite the first control coil. A heater-tube portion which projects from the protective tube and is located in the flow path of the intake air in the suction pipe of the internal-combustion engine is provided in which the second control coil is arranged for further influencing the power of the heating oil.

1 Claim, 1 Drawing Sheet

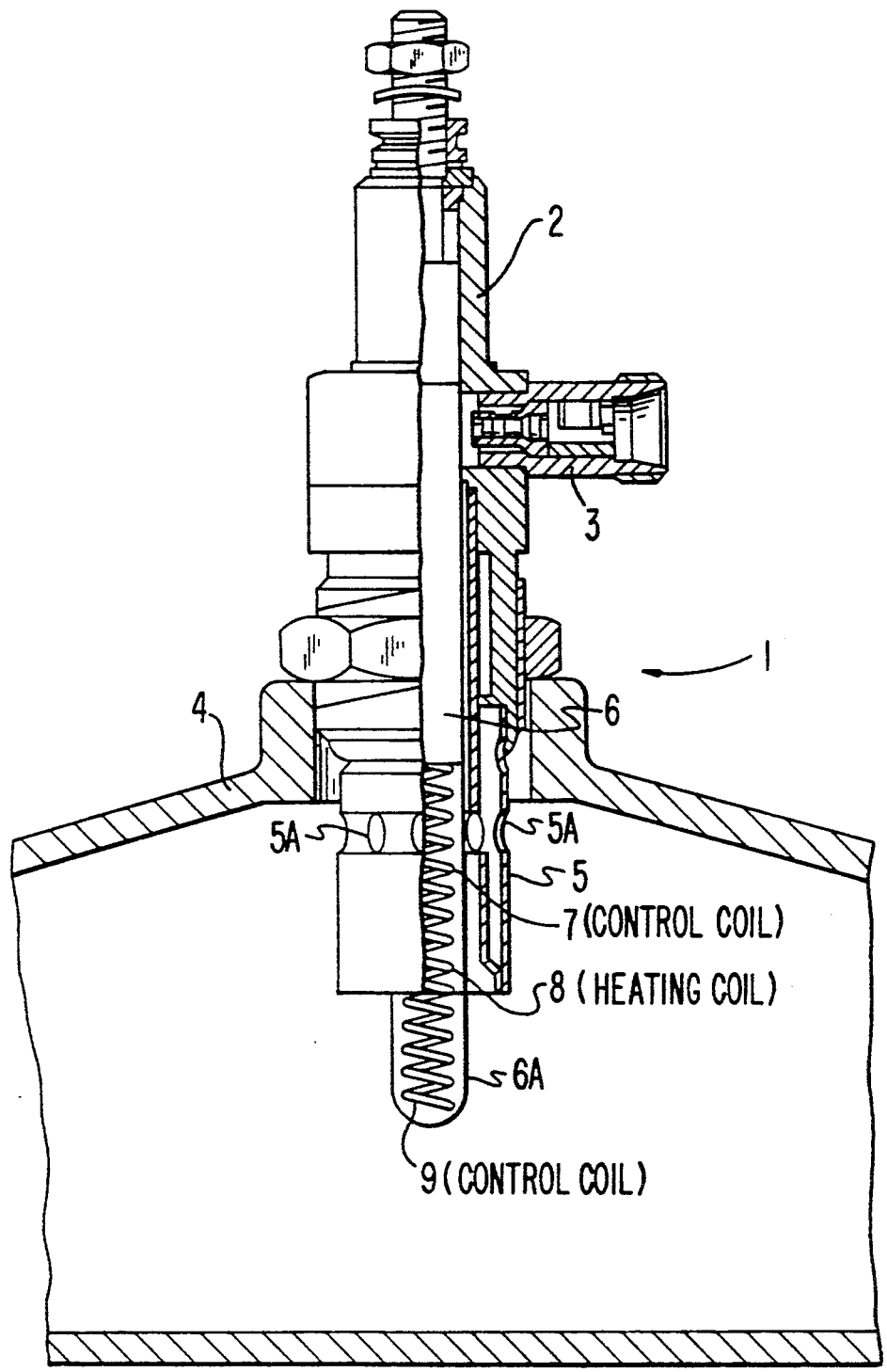

FLAME-TYPE HEATER PLUG WITH TWO CONTROL COILS FOR AN AIR-COMPRESSION FUEL-INJECTION INTERNAL-COMBUSTION ENGINE

BACKGROUND AND SUMMARY OF THE INVENTION

The invention relates to a flame-type heater plug for an air-compression fuel-injection internal-combustion engine, especially a direct-injection and superchargeable internal-combustion engine. Such a heater plug includes a plug housing with a proportioning insert provided for the fuel supply and with a protective tube projecting into the suction pipe of the internal-combustion engine and located in the flow path of the intake air, and a heater tube with a control coil level with the passage orifices arranged in the protective tube and with a heating coil extending approximately as far as the free end of the protective tube.

Flame-type heater plugs serve as a cold-starting aid and as a preheater system to make the diesel fuel more ignitable. They are preheated as a function of the temperature of the internal-combustion engine. For example, at temperatures below 0° C., before starting, since in the starting phase, with the internal-combustion engine cold and the outside temperature low, the heat generated during the high compression would not be sufficient to ignite the fuel. This would result in undue quantities of unburnt fuel mixture and a high soot emission.

The publication "BERU" aktuell", May 1987, issue 11, page IX, discloses a flame-type heater plug, in which a heater tube corresponding to the bar heater plug (see page VII) and with a control and heating coil is arranged in the protective tube or in the flame sleeve. Plugs of this type are self-regulating, that is to say, with an increasing temperature of the heater tube or of the control coil, the current consumption of the heating coil controlled by the control coil decreases.

During starting, fuel flows past the hot heater tube, ignites and heats the intake air flowing past. This ensures a rapid ignition of all the cylinders of the internal-combustion engine. However, a disadvantage which became evident is that, at a high air velocity in the intake pipe, the flame was sometimes blown out and it was therefore impossible to avoid starting difficulties and smoke emissions.

An object on which the invention is based is to provide measures on the above-mentioned flame-type heater plugs which ensure a fault-free operating cycle of the internal-combustion engine during the starting phase even at a high air throughput, especially in supercharged engines.

According to the invention, this object is achieved by an arrangement wherein the heater tube has a lengthened tube part which is arranged without protective tube in the air flow path, and wherein arranged additionally in the lengthened tube part is a control coil which is connected operatively to the heating coil.

As a result of the special design of the lower part of the flame-type heater plug, in which the lengthened heater tube with an additional control coil is located in the flow path of the intake air without protective tube, at high air velocities cooling occurs in this region and leads to an increased current consumption of the heating coil and thus to a temperature rise in the inflammation zone. The result is that the flame is not extinguished even with a high air throughput.

Although a coil subdivided into three portions in the heater tube is known from German Patent Document DE 3,309,133 A1, nevertheless in this coil arrangement there is only one control coil, specifically located between two heating coils. Moreover, the heater tube containing the three portions is arranged entirely in the protective tube of the flame-type heater plug.

Other objects, advantages and novel features of the present invention will become apparent from the following detailed description of the invention when considered in conjunction with the accompanying drawings.

BRIEF DESCRIPTION OF THE DRAWINGS

An exemplary embodiment, of the invention is schematically illustrated in the single drawing figure, specifically in front view on the side and in longitudinal section on the other side.

DETAILED DESCRIPTION OF THE DRAWINGS

A flame-type heater plug 1 for direct-injection autoignition internal-combustion engines includes a plug housing 2 with a screwed-in proportioning insert 3 for the fuel supply. The flame-type heater plug 1 is fastened to the suction pipe 4 of an internal-combustion engine and so projects with its protective tube 5 connected to the plug housing 2 into the suction pipe 4 that it is located in the flow path of the intake air. The protective tube 5 includes passage orifices 5A. The flame-type heater plug 1 has a heater pin or a heater tube 6 with an integrated first control coil 7, heating coil 8 and second control coil 9.

The heater tube 6 is so designed that a tube part 6a carrying the second control coil 9 projects from the protective tube 5 and is surrounded by the intake air. The ambient temperatures differ between the first and second control coils 7 and 9, since the portion of the heater tube 6 carrying the first control coil 7 around at the level of the passage orifices 5A is arranged to be protected by the protective tube 5 and the tube part 6a the heater tube carrying the second control coil 9 is arranged unprotected in the flow path of the intake air. Since, at a high air throughput, the lower temperature is at the second control coil, a higher power consumption of the heating coil 8 is ensured because the total resistance of the heater pin decreases and it becomes possible in the inflammation zone to attain higher temperatures which thus counteract the extinguishing of the flame.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Flame-type heater plug for an air-compression fuel-injection internal-combustion engine, especially a direct-injection and superchargable internal-combustion engine, comprising:
a plug housing with a proportioning insert provided for the fuel supply and with a protective tube having a free end adapted to project into the suction pipe of the internal-combustion engine and located in the flow path of the intake air, said protective tube being provided with passage orifices, and a heater tube secured at one end to the plug housing and extending in spaced relationship through the protective tube to terminate in a free end, said heater tube being provided with a first control coil level with the passage orifices arranged in the protective tube and with a heating coil extending only approximately as far as the free end of the protective tube, said first control coil serving to control the heating coil,
wherein the heater tube has a lengthened tube part which is arranged to extend beyond the free end of the protective tube in the air flow path, and wherein arranged additionally in the lengthened tube part is a second control coil for controlling the heater coil which is connected operatively to the heating coil and is arranged unprotected in the flow path of intake air.

* * * * *